April 4, 1939. W. J. CHIEVITZ 2,153,499
OIL SEAL
Filed Nov. 26, 1937
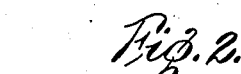
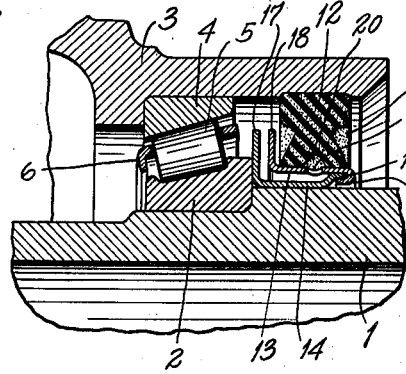
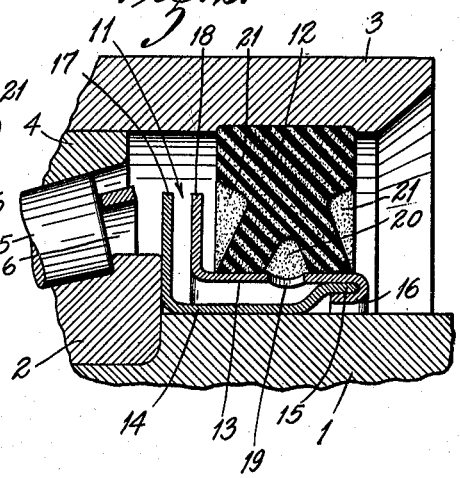
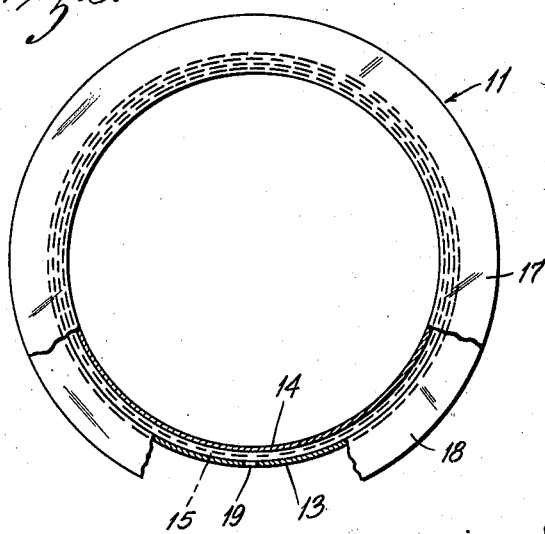
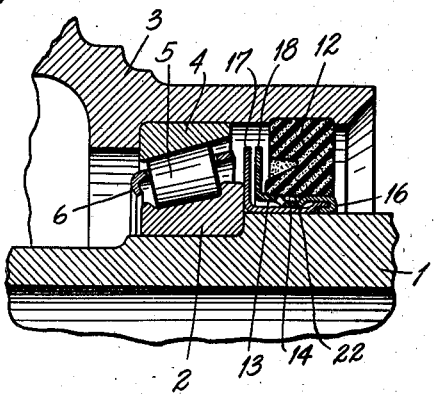
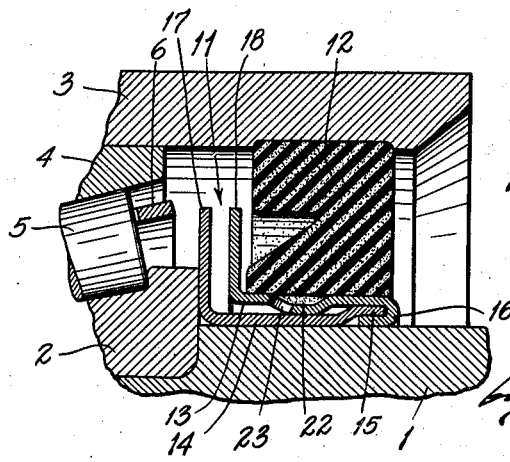
INVENTOR:
William J. Chievitz
HIS ATTORNEYS.

Patented Apr. 4, 1939

2,153,499

UNITED STATES PATENT OFFICE 2,153,499

OIL SEAL

William J. Chievitz, Canton, Ohio, assignor to The Timken Roller Bearing Company, Canton, Ohio, a corporation of Ohio Application November 26, 1937, Serial No. 176,519

8 Claims. (Cl. 286—5)

My invention relates to means for preventing the leakage of oil from bearings and consists in the combinations and arrangements of parts hereinafter described and claimed.

In the accompanying drawing which forms part of this specification and wherein like numerals refer to like parts wherever they occur.

Fig. 1 is a longitudinal sectional view of a bearing mounting equipped with my oil seal;

Fig. 2 is a similar view on an enlarged scale of a portion of the construction illustrated in Fig. 1;

Fig. 3 is mainly an end view of the oil flinger metal portion of my seal, with the lower portions of the circumferential flanges broken away and showing the lower parts of the tubular portions in section, Fig. 4 is a view similar to Fig. 1 showing a modification; and Fig. 5 is a view similar to Fig. 4 and showing a portion thereof on an enlarged scale.

In the accompanying drawing, 1 designates a rotating shaft having the cone 2 of a roller bearing mounted thereon and 3 designates a housing or other structure on which the cup or outer raceway member 4 of the roller bearing is mounted. 5 and 6 designate the tapered rollers and cage, respectively, of said tapered roller bearing.

My invention comprises two main elements, namely, an inner element 11, preferably of metal, which is adapted to be mounted on and rotate with the shaft, and an elastic outer element 12, in the form of a wide, thick ring, preferably of synthetic rubber, which is mounted on the housing and remains stationary therewith.

The inner element 11 comprises two tubular members 13, 14. These tubular members are of uneven diameter and are concentrically secured together at one end. In the construction illustrated, one end portion 15 of the inner tubular member 14 is offset outwardly and the adjacent end 16 of the outer tubular member 13 is doubled back inwardly around such offset end of the inner tubular member and crimped or spun into tightly gripping contact therewith, whereby the two tubular portions are held spaced apart in concentric relation. The other ends of the two tubular members have outwardly extending flanges 17, 18 which also are spaced apart. The outer tubular member has one or more holes 19 extending through its tubular portion.

The inner surface of the main outer element 12, namely, the elastic ring, has a sliding fit on the outer surface of the tubular metal element 11 and its end is spaced from the circumferential end flange of said tubular element. The elastic ring 12 has a circumferential groove 20 in its inner surface in register with the hole 19 or series of holes in the outer tubular metal member. Preferably the sides of the elastic ring are grooved, as shown at 21, to enable it to adapt itself to a sliding fit on the tubular portion of the outer metal member without undue pressure thereon.

The operation of the construction shown in Fig. 1 is as follows: Any oil which may leak past the roller bearing is likely to work its way to the groove 20 in the inner surface of the elastic ring. From this groove the leakage oil passes through the hole 19 in the outer metal member into the annular space between said tubular members and thence outwardly through the space between the end flanges from which it is flung back into the space at the large end of the roller bearing.

In the modification illustrated in Figs. 4 and 5, the inner surface of the elastic ring 12 has no groove but, in lieu thereof, a circumferential groove 22 is formed in the tubular portion of the outer metal member 13. In this case, an opening or openings 23 are formed through the wall of said groove thus communicating with said space between the two metal members. This modification operates in the manner above described.

What I claim is:

1. An oil seal comprising two tubular members secured together at one end and with outwardly extending flanges at their other ends, the main portions of the tubular and flange portions being spaced apart and the outer tubular portion having an opening therethrough, the spaces between said tubular and flange portions being clear and unobstructed and in communication with said opening.

2. In an oil seal, the combination of two tubular members of different diameters each having an outwardly extending flange at one end, said members being secured together concentrically with their tubular portions and flanges spaced apart and with the annular space between their tubular portions closed at a distance from their flanges, the outer tubular member having a hole therethrough at a point between said flanges and the point of closure, said annular space and the space between said flanges being clear from said hole to the outer margins of said flanges.

3. An oil seal comprising two tubular members secured together at one end and with outwardly extending flanges at their other ends, the main portions of the tubular and flange portions being spaced apart and the outer tubular portion having a circumferential groove and an opening through a side of said groove.

4. An oil seal comprising an inner tubular member adapted to be mounted on a shaft, said inner member having one end offset radially outwardly and having an outwardly extending annular flange at its other end, and an outer tubular member of larger diameter than said inner member, one end of said outer member being rebent and crimped around the unflanged end of the inner member and having an outwardly extending annular flange at its other end spaced from the flange of said inner member, said outer member also having a circumferential groove in its tubular portion and a hole in a side wall thereof.

5. An oil seal comprising an inner tubular member adapted to be mounted on a shaft, said inner member having one end offset radially outwardly and having an outwardly extending annular flange at its other end, and an outer tubular member of larger diameter than said inner member, one end of said outer member being rebent and crimped around the unflanged end of the inner member and having an outwardly extending annular flange at its other end spaced from the flange of said inner member, said outer member also having a circumferential groove in its tubular portion and a hole in a side wall thereof, the bottom wall of said groove bearing against the inner tubular member.

6. An oil seal consisting of an inner element adapted to fit on a shaft and an outer element adapted to fit in a housing, said inner element comprising two tubular members of different diameters each having an outwardly extending flange at one end, said members being secured together concentrically with their tubular portions and flanges spaced apart and with the annular space between their tubular portions closed at a distance from their flanges, the outer tubular member having a hole therethrough at a point between said flanges and the point of closure, and one of said elements having a circumferential groove in register with said hole.

7. An oil seal consisting of an inner element adapted to be mounted on a shaft and an outer element adapted to be mounted on a housing, the inner element comprising two tubular members of different diameters each having an outwardly extending flanges at one end, said members being secured together concentrically with their tubular portions and flanges spaced apart and with the annular space between their tubular portions closed at a distance from their flanges, the outer tubular member having a hole therethrough at a point between said flanges and the point of closure, and the outer element comprising an elastic ring adapted to make a sliding fit on the tubular portion of said outer tubular member and having a circumferential groove in register with said hole.

8. An oil seal consisting of an inner element adapted to fit on a shaft and an outer element adapted to fit in a housing, said inner element comprising two tubular members of different diameters each having an outwardly extending flange at one end, said members being secured together concentrically with their tubular portions and flanges spaced apart and with the annular space between their tubular portions closed at a distance from their flanges, the outer tubular member having a circumferential groove at a point between said flanges and the point of closure, and a hole through a side wall of said groove.

WILLIAM J. CHIEVITZ.